INVENTOR.
James L. Dunn Jr
BY
ATTORNEY

United States Patent Office 3,494,102
Patented Feb. 10, 1970

3,494,102
METHOD FOR REGENERATING A CARBON ADSORPTION BED WITH SUPERHEATED VAPORS
James L. Dunn, Jr., Lake Jackson, Tex., assignor to The Dow Chemical Company, Midland, Mich., a corporation of Delaware
Filed Mar. 22, 1968, Ser. No. 715,266
Int. Cl. B01d 53/04, 53/00
U.S. Cl. 55—62                              7 Claims

ABSTRACT OF THE DISCLOSURE

A method for regenerating a carbon adsorption bed which has adsorbed thereon a volatilizable organic solvent by introducing into the carbon bed a superheated vapor of a vaporizable organic solvent, preferably the same organic solvent, to heat the bed and vaporize the adsorbed solvent and/or other valuable materials adsorbed on said bed therefrom, circulating a portion of the off-vapors from the bed to a superheat source, thence back to the bed until substantially all of the adsorbed materials have been vaporized and the bed is regenerated, and condensing unrecycled vapors to recover the adsorbed material removed from the bed.

Background of invention

Industry has for years recovered valuable organic vapors from process gases by passing the vapor diluted with the gas through a bed of adsorbent such as carbon. These beds of carbon gradually become saturated with the organic constituents and must be regenerated to remove and recover the organic constituents. The normal method for regenerating the bed and recovering the organic constituents is to steam the bed with live steam to heat the bed to the vaporization temperature of the organic constituents adsorbed thereon. The steam and vapors are withdrawn from the bed and condensed. This procedure of course, necessitates separation of the organic constituents from the water. Such separations add to the overall expense of the operation.

It would be advantageous, and is therefore an object of the present invention, to provide a process for regeneration of carbon beds which is less expensive and which has fewer steps. Another object of the present invention is to provide a process which does not require a dissimilar material as the heat source during regeneration of carbon beds. These and other objects will become apparent to those skilled in the art to which the invention pertains.

Brief description of invention

It has now been found that carbon beds can be regenerated efficiently and without use of steam or resistance heating of the bed, by passing through the bed, during the regeneration cycle, a vapor of an organic liquid which has been heated to at least the boiling point of the organic constituent to be removed from the bed. This technique permits the utilization of materials which can be separated from the organic constituent more readily and completely than water. A preferred embodiment of the present invention is the employment of an organic liquid which is the same as the organic constituent adsorbed on the bed. Thus, in the preferred embodiment, no separation step is required to make reusable the organic constituent. It is to be understood that the present proces for regeneration can be employed in continuous adsorption systems wherein two or more beds are employed in parallel, one on adsorption cycle, the other on regeneration, as well as discontinuous processes.

Figure 1:
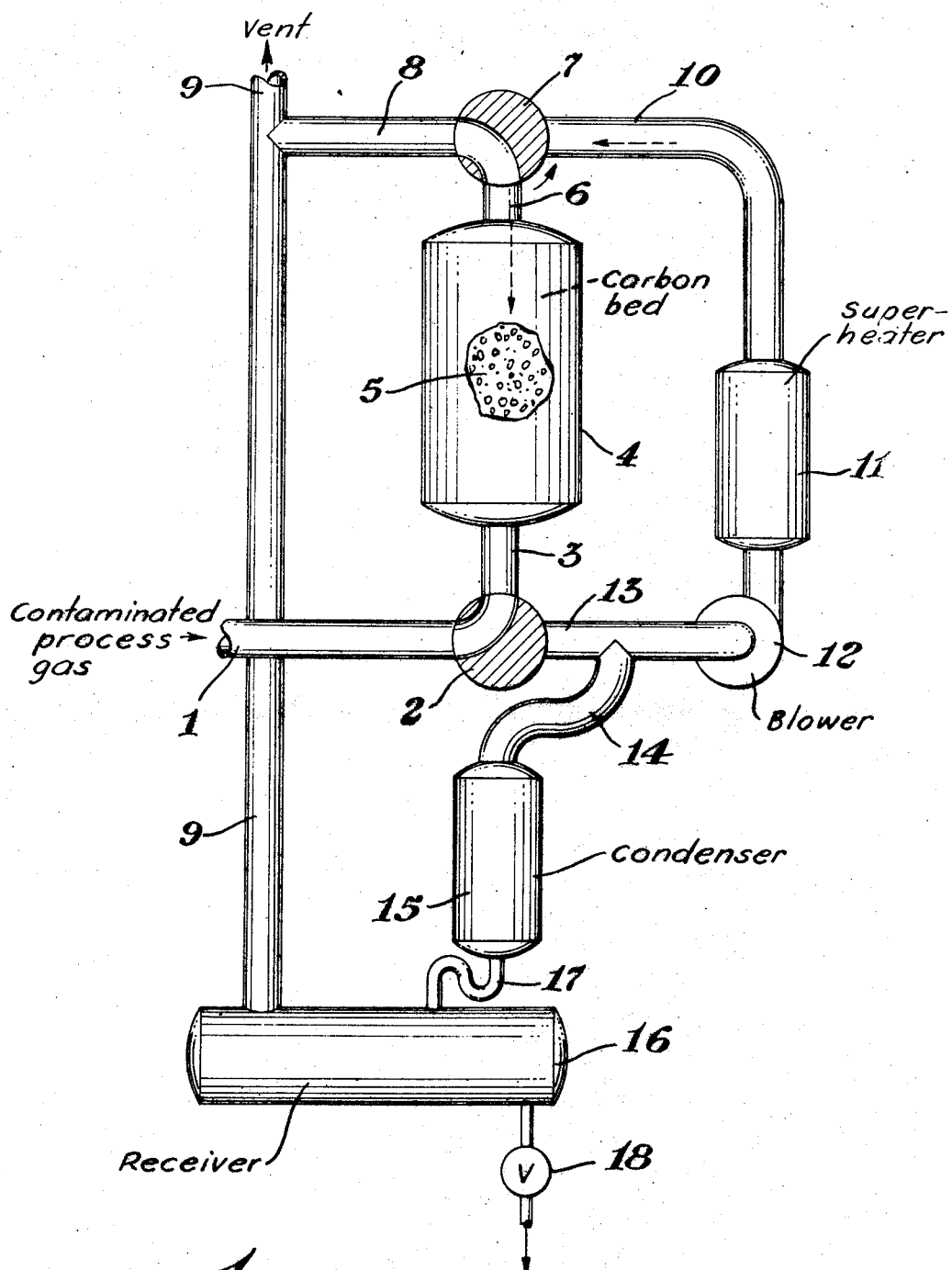
FIGURE 1 represents a simplified elevation of the piping, valving and flow directions of a single bed carbon adsorber modified by incorporation of the super-heater and condensers in a manner to employ the method of the present invention.

The apparatus for carrying out the present invention is shown in FIGURE 1 in simplified diagram with relation to a single carbon adsorber bed which operates in discontinuous cycles of adsorption and regeneration. The apparatus comprises a delivery pipe 1 through which the vapor-air mixture can be transported to the recovery systems. The delivery pipe 1 connects to inlet valve 2 which is shown in a position to admit the gas-vapor mixture into the inlet pipe 3 of the shell 4 which contains a bed 5 of carbon, activated carbon, charcoal or similar adsorptive bodies. Associated with the shell 4 in fluid communication with the interior bed 5 is an outlet pipe 6 which connects through an outlet valve 7 to a vent line 8 which further communicates with the atmosphere, for example, through atmospheric vent pipe 9. Valves 2 and 7 are designed so that when they are reversed, a path of fluid communication will open from the regeneration vapor line 10 which delivers superheated vapors from superheater 11 into the carbon bed 5. Completing the regeneration system is a blower 12 in fluid communication with the superheater 11 and inlet valve 2 through vapor line 13. Connected into vapor line 13 at some convenient point between the blower 12 and the inlet valve 2 is a condenser line 14 for communicating vapor line 13 with a condenser 15. Extending from condenser 15 and connecting said condenser 15 with a storage tank 16 is a liquid trap line 17. The storage tank 16 is equalized to the atmosphere through atmospheric vent pipe 9. A valved line 18 is provided from storage tank 16 for withdrawal of liquid from the tank 16.

Detailed description of invention

The operation of apparatus shown in FIGURE 1 is described first when the apparatus is set for adsorption and next when set for regeneration.

In accordance with the present invention, a gas-vapor mixture, as for example, air and trichloroethylene, from a process is directed to the adsorption system through delivery pipe 1 and with inlet valve 2 set as shown in FIGURE 1 directed into inlet pipe 3. The gas-vapor mixture on entering bed 5 contained within shell 4 is contacted with the surface of the bed 5 whereat the vapors are adsorbed thereon. The gas, in this instance air, passes through the bed 5 and into outlet pipe 6, through outlet valve 7, into vent pipe 8 and finally to the atmosphere through atmospheric vent 9. The system is operated in this manner until the carbon or other adsorbent has become saturated with vapors adsorbed thereon. When this phenomenon occurs, the valves 2 and 7 are caused to rotate in a manner and an amount to cut off the flow of gas-vapor to the bed 5 and close the bed 5 from communication with the atmospheric vent 9. The system is now in a condition for regeneration. Superheater 11 is activated along with blower 12. This condition causes the vapor-air mixture to flow from the bed through inlet valve 2 and the blower 12 to the superheater 11. The vapor-air mixture is heated to several degrees above the boiling point of the vapor constituent, thus developing a superheated vapor-air mixture. The resulting superheated mixture in caused to flow from the superehater 11 through regeneration vapor line 10 and outlet valve 7 into the bed 5. The superheat of the vapor-air mixture is transferred to the bed causing some of the adsorbed vapor to leave the carbon adsorbent. This enriched vapor-air mixture is drawn from the bed 5 into the circuit just described. With each successive cycle, more adsorbed vapor is removed from the adsorbent. When the enriched vapor-air mixture volume exceeds the volume of the system (closed circuit), the excess passes into condenser line 14 and condenser 15 wherein it is condensed. The liquid entrapped with air is delivered through trap 17 to storage tank 16. Upon discharge into storage tank 16 any trapped air is released to the atmospheric vent 9. When the entire bed is heated to at least the boiling point of the adsorbed vapor constituent, the bed is regenerated. The superheater 11 and blower 12 are deactivated and the bed allowed to cool or be cooled by suitable separate means. Thereafter the valves 2 and 7 are returned ot their original position and the bed is ready to receive gas-vapor on an adsorption cycle.

Figure 2:
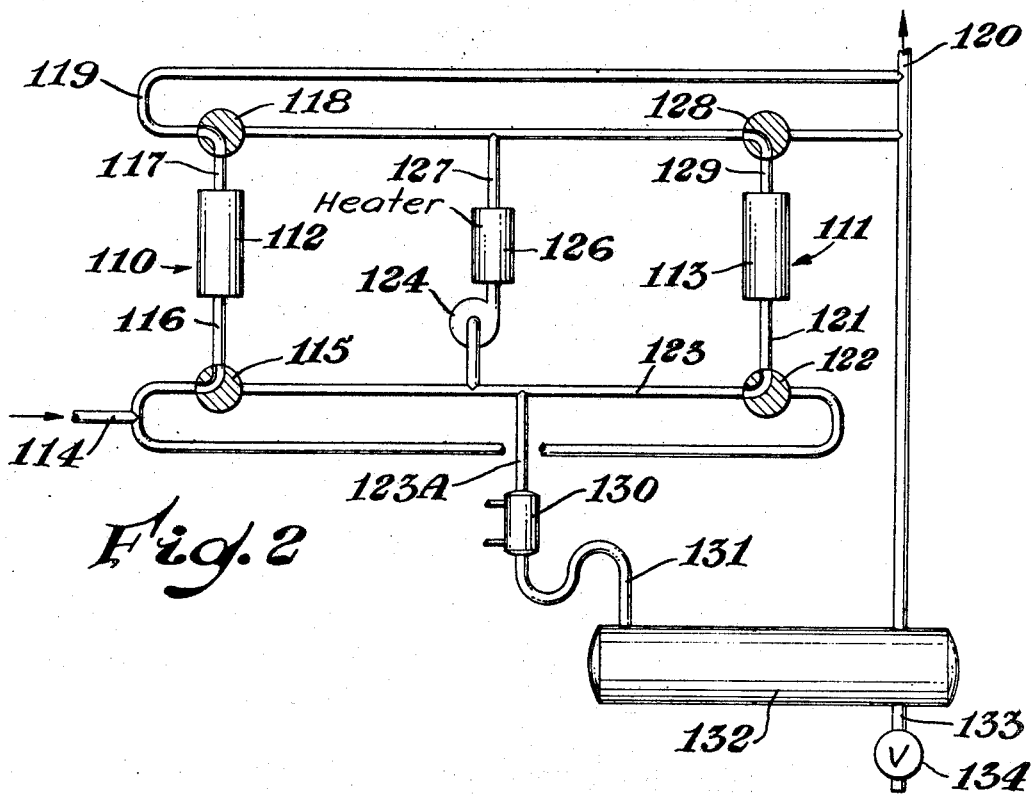
FIGURE 2 represents a line drawing of a two-bed continuous carbon adsorber, one bed adsorbing and the other regenerating; and, FIGURE 3 represents the schematic diagram of the valve arrangements during operation of the two-bed continuous adsorber shown in FIGURE 2.
Figures 3, 4:
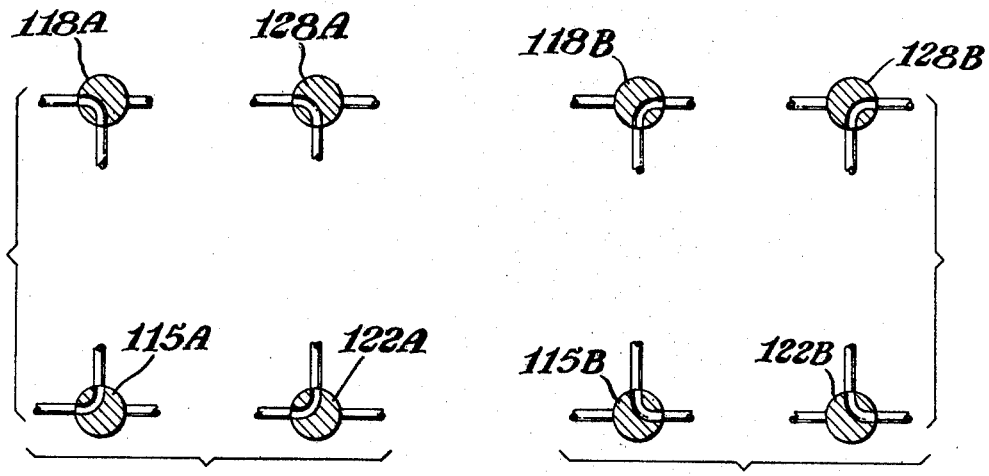
FIGURE 4 represents the schematic diagram of the valve arrangements during operation of the adsorber shown in FIGURE 2 with the beds reversed.

The foregoing disclosure describes a discontinuous process such as is employed in an industry wherein the operations do not produce gases on a continuous basis. The following description will describe an embodiment of the present invention which will permit continuous removal of said organic vapors from air containing the same. The basic requirements for a continuous process are at least two carbon adsorbers such as shown in FIGURE 2. Each adsorber, 110 and 111, contains carbon granules 112 and 113. The piping and valving necessary to maintain a bed of carbon which is capable of removing the volatile organic material say from air is shown in line drawings and schematic valve positions are shown in FIGURES 3 and 4, respectively. The non-condensable gaseous fluid containing the volatile organic material and from which it is desired to remove the latter, enters the pipe 114 and passes through valve 115 which, when in position as indicated as 115A in the schematic diagram of FIGURE 3, directs the fluid and organic material into pipe 116 so that it enters adsorber 110, passes into contact with carbon bed 112 and the organic material is adsorbed onto the carbon. The non-condensable gas passes upwardly through the bed to outlet pipe 117 and is directed by valve 118, when in position 118A, to pipe 119 thence into exhaust stack 120.

Simultaneously, adsorber 111 is on a regeneration cycle. The non-condensable gas and vapors which are entrapped in adsorber 111 when the valving is operated to switch adsorber 111 from its purification cycle to regeneration, are drawn from the interior of adsorber 111 through pipe 121 and directed by valve 122, when in position indicated by 122A in the schematic diagram FIGURE 3, into pipe 123. The non-condensable gases and vapors are drawn in this path by the suction created when blower 124 is activated. These gases and vapors are then moved through pipe 123, through blower 124 and into heater 126. The heater 126 being activated, heats the vapors and any air to the boiling point and above, for example, of the solvent. The hot vapor and any air pass out of the heater 126 and are directed by pipe 127 to adsorber 113, through valve 128, which is in position indicated in the schematic 128A, and pipe 129 into the interior of adsorber 111. The hot gases and vapor give up their heat to the volatile organic material adsorbed on the carbon bed 113, vaporizing it from the bed. The enriched vapor and gases are drawn from the bed 113 by the suction created by blower 124. Thus, there is provided a cyclic pattern of hot vapors and gases to the bed 113, to heat the bed to a point wherein it gives up the vapors it adsorbed on the adsorption cycle. Gases and vapors in excess of the volume of the circuit are forced into condenser 130 through piping 123A. The vapors passing into the condenser are condensed and thus withdrawn from the circuit. The liquid condensate from condenser 130 passes by gravity through liquid trap 131 into storage tank 132. Any entrapped gas (air) carried into storage tank 132 is released in the tank and vents to the atmosphere through vent 120 which is connected to the tank. Liquid is withdrawn from the tank through pipe 133 by manipulation of valve 134. When the carbon bed 113 is regenerated, the superheater 126 is deactivated, the bed cooled, the blower turned off and the valves 115, 118, 122, 128 manipulated to the positions illustrated in FIGURE 4. This operation places bed 112 on regeneration and bed 113 on adsorption. The procedures described for regeneration of bed 113 are repeated for bed 112.

Various modifications can be made in the valving as will be apparent to those skilled in the art to place the freshly regenerated adbsorber bed in series with the adsorbing bed firstly to insure the vapors which are retained in the fresh bed circuit are not introduced into the atmosphere and secondly in series after the adsorbing bed just prior to its regeneration to insure maximum saturation of the adsorbing bed without loss of vapors to the atmosphere.

The above method and apparatus have particular utility in removing solvent vapors from air in processes wherein the air is contaminated with the solvent in a drying process. The process and apparatus permit the removal of the solvent from the air and recovery of solvent employing the solvent as the regenerative source. Solvents which can be removed from the carbon bed when adsorbed from air or other non-condensable gases are the chlorinated solvents such as methylene chloride, methyl chloride, chloroform, carbon tetrachloride, ethyl chloride, ethylene dichloride (dichlorethane), trichloroethylene, perchloroethylene, 1,1,1-trichloroethane and the like, benzene, toluene, the naphthas, as well as the ketones such as methyle ethyl ketone, acetone and the like.

It is generally preferred that the same solvent be employed to regenerate the bed, however, if a solvent is adsorbed on the carbon which can be readily separated from a regenerative solvent of a different kind of class, it may be used. However, as is clear, this technique requires separation after condensation.

I claim:
1. A method for regenerating a carbon adsorption bed which has adsorbed thereon a volatilizable organic solvent by drawing said solvent from said bed, superheating said solvent and introducing into the carbon bed said superheated vapor of the vaporizable organic solvent to heat the bed and vaporize the adsorbed solvent and other impurities therefrom, circulating a portion of the off-vapors from the bed to a superheat source, thence back to the bed until substantially all of the adsorbed materials have been vaporized and the bed is regenerated, and consensing the unrecycled portion of the vapors to recover the adsorbed material removed from the bed.

2. The method of claim 1 wherein the volatilizable organic solvent is a chlorinated hydrocarbon.

3. The method of claim 1 wherein the volatilizable organic solvent is trichloroethylene.

4. The method of claim 1 wherein the volatizable organic solvent is perchloroethylene.

5. The method of claim 1 wherein the volatizable organic solvent is 1,1,1-trichloroethane.

6. The method in claim 1 wherein the superheated solvent is the same as the adsorbed solvent.

7. A method for continuously removnig vapors associated with a gas which comprises:
(1) introducing the vapor containing gas into a first carbon adsorber thereby to adsorb the vapors onto said carbon,
(2) removing the said gas from said adsorber free of vapors,
(3) continuing said adsorption cycle until the carbon bed is substantially saturated with vapors,
(4) diverting said vapor containing gas from said first adsorber to a second adsorber which has adsorption capacity, thus establishing said bed on an adsorption cycle, (5) connecting said first adsorber in fluid communication with a fluid moving means and a fluid heating means, thereby to place said bed on regeneration cycle, (6) withdrawing air and unadsorbed vapors from said first adsorber, heating said vapors to at least the boiling point of the liquid form of said vapors, (7) directing said superheated vapors in a countercurrent manner through said bed, (8) continuing said withdrawal of vapors from said adsorber and cycling the same through said heating means and into said adsorber thereby to heat the adsorbing bed and remove said vapors adsorbed thereon, (9) directing that portion of vapors in excess of the volume of the gaseous volume of the carbon adsorber heating means and the fluid communication means to a condensing means, condensing and recovering said condensed vapors,

(10) continuing said cycling and condensing until substantially all of the vapors adsorbed onto the bed are removed,

(11) cooling said bed and switching said bed to said adsorbing cycle, and

(12) switching said second bed onto regeneration cycle.

References Cited

UNITED STATES PATENTS

| 2,779,770 | 1/1957 | Cass | 55—74 |
| 2,823,765 | 2/1958 | Maslan | 55—74 |
| 3,405,507 | 10/1968 | Spencer et al. | 55—62 |

SAMIH N. ZAHARNA, Primary Examiner

CHARLES N. HART, Assistant Examiner